(No Model.)
W. H. COOPER.
SEED PLANTER AND FERTILIZER DISTRIBUTER.
No. 439,811. Patented Nov. 4, 1890.
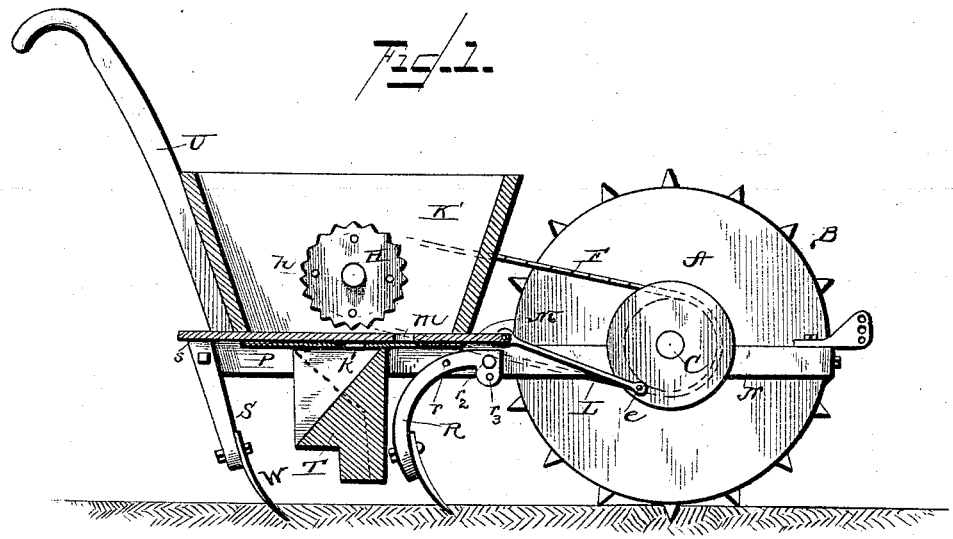
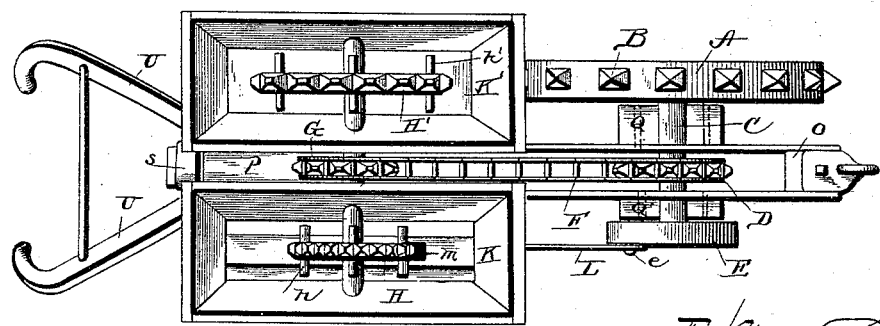
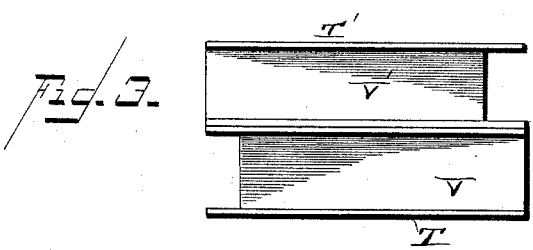
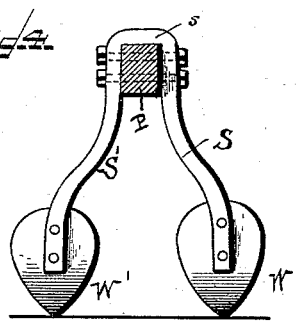
WITNESSES
F. L. Durand
N. A. Smith
INVENTOR
Watkins H. Cooper
by
Whitman + Wilkinson
his Attorneys

UNITED STATES PATENT OFFICE.

WATKINS H. COOPER, OF OPELIKA, ALABAMA.

SEED-PLANTER AND FERTILIZER-DISTRIBUTER.

SPECIFICATION forming part of Letters Patent No. 439,811, dated November 4, 1890.

Application filed July 10, 1890. Serial No. 358,254. (No model.)

*To all whom it may concern:*

Be it known that I, WATKINS H. COOPER, a citizen of the United States, residing at Opelika, in the county of Lee and State of Alabama, have invented certain new and useful Improvements in Seed-Planters and Fertilizer-Distributers; and I do hereby declare the following to be a full, clear, and exact description of the invention, such as will enable others skilled in the art to which it appertains to make and use the same.

My invention relates to agricultural implements, and has for its object to provide a simple and efficient implement for planting corn, peas, wheat, oats, and other small seeds, and for simultaneously fertilizing the ground.

In my combined seed-planter and fertilizer-distributer the operation of opening a furrow for and dropping and covering the seed and distributing the guano or other fertilizer is carried on simultaneously.

Reference is had to the accompanying drawings, wherein similar parts are indicated by similar letters.

Figure 1 represents a sectional elevation of my combined planter and fertilizer-distributer, the seed-hopper and seed-chute being broken away to show the interior thereof. Fig. 2 represents a plan view of my combined planter and fertilizer. Fig. 3 represents a view of the two inclined planes V and V' inside the chutes T and T'. Fig. 4 represents a rear view of the two covering-plows.

A, Fig. 1, represents a wheel with spikes or teeth B thereon, which enter the earth to prevent the wheel from slipping in soft or lumpy ground, and so dropping the seed and fertilizer irregularly.

C represents the axle of the wheel A, bearing the smaller sprocket-wheel D and the disk E.

The sprocket-wheel D is connected by the chain F to the sprocket-wheel G on the same shaft with the mixers or agitators H and H' in the seed and fertilizer hoppers K and K', respectively.

On the end of the axle C is a disk E, carrying a crank-pin $e$ and connecting-rod L. The other end of the connecting-rod engages in the slide M, having a hole $m$, which allows the seed to drop through whenever it passes over the hole $k$ in the seed-hopper.

The mixers H and H' are represented as disks of wood jagged on their peripheries and perforated for the pins $h$, the jags and pins being for the purpose of keeping the seed or fertilizer well stirred up and prevent it from packing.

It will be readily seen that a toothed wheel of iron or wood would accomplish the same result.

The quantity of fertilizer or seed to be dropped is regulated by adjusting the size of the holes $k'$, $k$, and $m$ in any convenient manner.

The parallel beams N are composed of two parallel plates of iron bolted to each other and inclosing the timbers O and P and the sprocket-wheel D.

To increase the bearings of the shaft C, two shoulders of wood Q and Q' are bolted onto the iron plates.

To the forward end of the plow-beam O the team is hitched to a device of ordinary construction. Near the center of the plow-beam the plow-standard R, having a bifurcated shank, is secured, preferably with a bolt through $r$, and another through either of two bolt-holes $r^2$ and $r^3$, whereby the depth to which the furrow is opened may be altered when desired.

S and S' are two plow-shanks, preferably made of one piece of iron or steel bent at $s$ for covering both the seed and fertilizer.

T and T' are two chutes leading from the seed and fertilizer hoppers, respectively. Inside of the chute T' there is an inclined plane V', which throws the fertilizer close behind the plow R, and some of the earth therefrom falls back in the furrow and partly covers the fertilizer. Inside the chute T the inclined plane V slopes in the opposite direction, as shown in Fig. 3, giving the earth ample time to crumble back behind the plow R before the seed is dropped. Moreover, the two chutes being side by side, the seed is not dropped immediately over the fertilizer, but close by and to one side of it in the same furrow.

U U are the plow-handles bolted to the plow-beam and to the rear ends of the hoppers.

As my agricultural implement is dragged forward, the toothed wheel A revolves, turning the mixers H and H' by means of the chain and sprocket wheels D and G. At the same time the disk E and connecting-rod L move the slide M backward and forward, causing the seed to be dropped every time the hole $m$ passes over the hole $k'$.

The plow R opens the furrow for both seed and fertilizer, the fertilizer drops through the hole $k'$ and funnel T', and the plows S and S' cover up both in the same furrow.

The peculiar advantages of my agricultural implement are: that the toothed wheel A does not slip and so cause irregularity in dropping the seed and fertilizer. My use of one wheel instead of the customary two renders my implement more convenient for turning sharp corners, avoiding obstructions — such as stumps or rocks—and in hillside-plowing, where the furrows are curved and not straight. The fertilizer is laid close enough to the seed to give the best result in nourishing the seed, and the general features of my implement render it compact, handy, and not so complex as to require in repairing or use any skilled labor other than that ordinarily found on farms. The works, except the plows and conductors, being all above the plow-stock, are not liable to become clogged with vines, weeds, or clods.

Having now described my invention, what I claim, and desire to secure by Letters Patent, is—

1. In a combined seed-planter and fertilizer-distributer, the combination of a toothed wheel A, journaled at one side of the beam, the open beam P, the sprocket-wheel D, journaled therein, the chain F, engaging said sprocket-wheel, and the agitators H and H', mounted on the same shaft with the sprocket-wheel G, substantially as described.

2. In a combined seed-planter and fertilizer-distributer, the combination of a toothed wheel A, journaled at one side of the beam, the open beam P, the sprocket-wheel D, journaled therein, the chain F, engaging the said sprocket-wheels D and G, the disk E on the axle C, and the crank-pin $e$ on the said disk engaging the connecting-rod L and reciprocating feed-slide M in the seed-hopper, substantially as described.

3. In a combined seed-planter and fertilizer-distributer, the combination of a toothed wheel A, journaled at one side of the beam, the open beam P, the sprocket-wheel D, journaled therein, the chain F, engaging the sprocket-wheels D and G, the agitators H and H', having serrated edges, with pins $h$ set crosswise mounted on the same shaft with the sprocket-wheel G, the disk E on the axle C, the crank-pin $e$ on the said disk engaging the connecting-rod L and the reciprocating slide M in the seed-hopper K, and the covering-plows W and W', having shanks composed of a bar of iron or steel bent at $s$ and bolted to the beam P, substantially as described.

In testimony whereof I affix my signature in presence of two witnesses.

WATKINS H. COOPER.

Witnesses:
N. P. RENFRO,
W. K. FREDERICK.